United States Patent
Rousu et al.

(10) Patent No.: US 9,066,346 B2
(45) Date of Patent: Jun. 23, 2015

(54) FREQUENCY SUB-BAND SELECTION IN WIRELESS COMMUNICATIONS

(75) Inventors: Seppo Rousu, Oulu (FI); Ville Vintola, Kirkkonummi (FI)

(73) Assignee: BROADCOM CORPORATION, Irvine, CA (US)

( * ) Notice: Subject to any disclaimer, the term of this patent is extended or adjusted under 35 U.S.C. 154(b) by 802 days.

(21) Appl. No.: 13/310,096

(22) Filed: Dec. 2, 2011

(65) Prior Publication Data

US 2013/0137475 A1    May 30, 2013

(30) Foreign Application Priority Data

Nov. 25, 2011    (GB) .................................. 1120393.2

(51) Int. Cl.
*H04W 72/04*    (2009.01)

(52) U.S. Cl.
CPC ................................. *H04W 72/0453* (2013.01)

(58) Field of Classification Search
None
See application file for complete search history.

(56) References Cited

U.S. PATENT DOCUMENTS

| 2006/0211426 A1* | 9/2006 | Costa et al. ................... 455/450 |
| 2008/0013599 A1* | 1/2008 | Malladi ........................ 375/132 |
| 2010/0111139 A1* | 5/2010 | Arnott et al. .................. 375/133 |

FOREIGN PATENT DOCUMENTS

WO    WO 2008/009027 A2    1/2008

* cited by examiner

*Primary Examiner* — Philip Sobutka
(74) *Attorney, Agent, or Firm* — Oblon, McClelland, Maier & Neustadt, L.L.P.

(57) ABSTRACT

This document discloses a solution where a network element of a cellular communication system detects appearance of a terminal device in the cellular communication system. In connection with registering the terminal device in the cellular communication system, the network element determines that a native frequency band of the terminal device is a sub-band of an operating frequency band of the cellular communication system and, then, allocates to the terminal device frequency resources from the native frequency band of the terminal device.

20 Claims, 3 Drawing Sheets

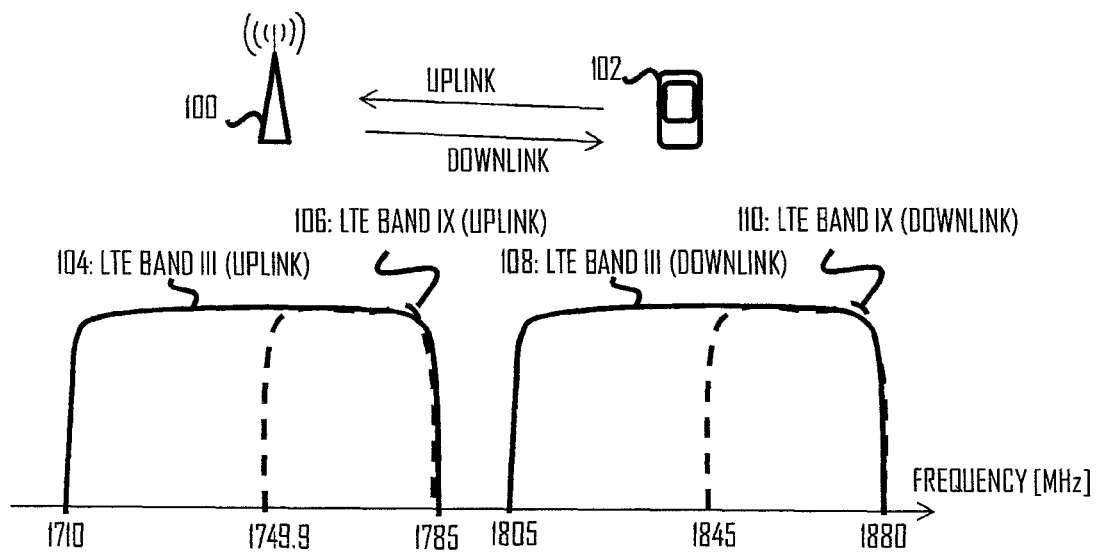

FREQUENCY SUB-BAND SELECTION IN WIRELESS COMMUNICATIONS

FIELD

The invention relates to the field of radio communications and, particularly, to selecting an operating frequency sub-band for a terminal device.

BACKGROUND

Different operating frequencies have been adopted for a given cellular telecommunication system in different geographical areas. Furthermore, different bandwidths and different carrier aggregation component combinations may be used in different geographical areas, which increases hardware complexity of terminal devices.

BRIEF DESCRIPTION

According to an aspect of the present invention, there is provided a method comprising: detecting, in a network element of a cellular communication system, appearance of a terminal device in the cellular communication system; determining, in connection with registering the terminal device in the cellular communication system, that a native frequency band of the terminal device is a sub-band of an operating frequency band of the cellular communication system; and allocating to the terminal device frequency resources from the native frequency band of the terminal device.

According to another aspect of the present invention, there is provided a method comprising: initiating a search for a cellular communication network in a terminal device having a split-band radio frequency filter splitting an operating frequency band of the terminal device into at least two sub-bands, wherein the terminal device is configured to search for the cellular communication network from the at least two sub-bands; detecting the cellular communication network operating on one of the at least two sub-bands; determining internally in the terminal device whether or not the terminal device is allowed to operate in the cellular communication network; and if the terminal device is allowed to operate in the cellular communication network, selecting the sub-band on which the cellular communication network was detected for communication with the cellular communication network.

According to another aspect of the present invention, there is provided an apparatus comprising means for detecting appearance of a terminal device in the cellular communication system; means for determining, in connection with registering the terminal device in the cellular communication system, that a native frequency band of the terminal device is a sub-band of an operating frequency band of the cellular communication system; and means for allocating to the terminal device frequency resources from the native frequency band of the terminal device.

According to another aspect of the present invention, there is provided an apparatus comprising means initiating a search for a cellular communication network in a terminal device having a split-band radio frequency filter splitting an operating frequency band of the terminal device into at least two sub-bands, wherein the terminal device is configured to search for the cellular communication network from the at least two sub-bands; means for detecting the cellular communication network operating on one of the at least two sub-bands; means for determining internally in the terminal device whether or not the terminal device is allowed to operate in the cellular communication network; and means for selecting, if the terminal device is allowed to operate in the cellular communication network, the sub-band on which the cellular communication network was detected for communication with the cellular communication network.

According to another aspect of the present invention, there is provided an apparatus comprising: at least one processor; and at least one memory including program instructions, wherein the at least one memory and the computer program code are configured, with the at least one processor, to cause the apparatus to: detect appearance of a terminal device in a cellular communication system; determine, in connection with registering the terminal device in the cellular communication system, that a native frequency band of the terminal device is a sub-band of an operating frequency band of the cellular communication system; and allocating to the terminal device frequency resources from the native frequency band of the terminal device.

According to another aspect of the present invention, there is provided an apparatus comprising: at least one processor; and at least one memory including program instructions, wherein the at least one memory and the computer program code are configured, with the at least one processor, to cause the apparatus to: initiate a search for a cellular communication network in a terminal device having a split-band radio frequency filter splitting an operating frequency band of the terminal device into at least two sub-bands, wherein the terminal device is configured to search for the cellular communication network from the at least two sub-bands; detect the cellular communication network operating on one of the at least two sub-bands; determine internally in the terminal device whether or not the terminal device is allowed to operate in the cellular communication network; and if the terminal device is allowed to operate in the cellular communication network, selecting the sub-band on which the cellular communication network was detected for communication with the cellular communication network.

According to yet another aspect of the present invention, there is provided a computer program product embodied on a non-transitory computer readable distribution medium and configured to execute a computer process comprising: detecting, in a network element of a cellular communication system, appearance of a terminal device in the cellular communication system; determining, in connection with registering the terminal device in the cellular communication system, that a native frequency band of the terminal device is a sub-band of an operating frequency band of the cellular communication system; and allocating to the terminal device frequency resources from the native frequency band of the terminal device.

According to yet another aspect of the present invention, there is provided a computer program product embodied on a non-transitory computer readable distribution medium and configured to execute a computer process comprising: initiating a search for a cellular communication network in a terminal device having a split-band radio frequency filter splitting an operating frequency band of the terminal device into at least two sub-bands, wherein the terminal device is configured to search for the cellular communication network from the at least two sub-bands; detecting the cellular communication network operating on one of the at least two sub-bands; determining internally in the terminal device whether or not the terminal device is allowed to operate in the cellular communication network; and if the terminal device is allowed to operate in the cellular communication network, selecting the sub-band on which the cellular communication network was detected for communication with the cellular communication network.

Embodiments of the invention are defined in the dependent claims.

LIST OF DRAWINGS

Embodiments of the present invention are described below, by way of example only, with reference to the accompanying drawings, in which FIG. 1 illustrates communication between a terminal device and a cellular telecommunication system and respective operating frequency bands;

FIGS. 2 to 4 illustrate flow diagrams of processes for allocating frequency resources to a roaming terminal device according to some embodiments of the invention;

DESCRIPTION OF EMBODIMENTS

Figure 5:
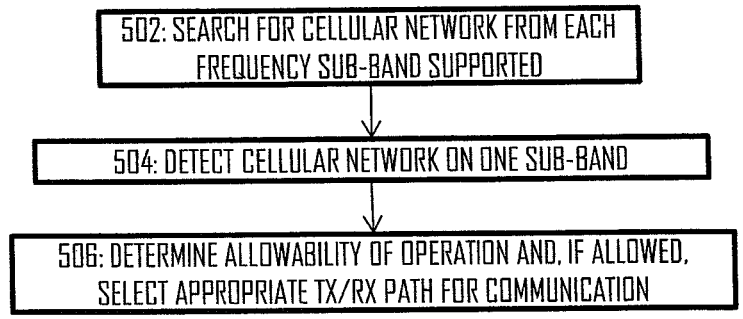
FIGS. 5 and 6 illustrate flow diagrams of processes for network search and associated operation in the roaming terminal device according to some embodiments of the invention.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

FIG. 1 illustrates a link between a base station 100 of a cellular communication network and a terminal device 102 having a connection in the cellular communication network. In some embodiments terminal/device/machine/automotive may have at least one other connection with at least one other wireless communication device without the cellular communication network interaction. Such a connection may be called a device-to-device, machine to machine, vehicle to vehicle connection. Additionally, terminal device 102 may have multiple active communications with different radio communication systems on one or multiple frequency bands. One example of the latter is a carrier aggregation (CA) scheme where the terminal device 102 communicates concurrently on a plurality of radio frequency carriers. Embodiments of the CA scheme are intra-band CA, inter-band CA, contiguous CA and non-contiguous CA containing various combinations for uplink and downlink directions. Cellular communication network employing the same radio communication protocol may operate on different frequency bands in different geographical areas. For example, one of the frequency bands utilized in Europe by a Long-Term Evolution of Universal Mobile Telecommunication System (UMTS LTE) is between frequencies 1805 and 1880 MHz for downlink (108 in FIG. 1) and between frequencies 1710 and 1785 MHz for uplink (104 in FIG. 1), as shown in FIG. 1 by the continuous lining. This is known as UMTS LTE Band 3 (or III). As another example, one of the frequency bands operated in Japan form a sub-band of Band III between frequencies 1844.9 and 1879.9 MHz for downlink (110 in FIG. 1) and between frequencies 1749.9 and 1784.9 MHz for uplink (106 in FIG. 1), and this LTE band 9 (or IX) is shown in FIG. 1 by the dotted line. Both bands 3 and 9 are implemented as a frequency-division duplex (FDD) method. Other FDD frequency bands are employed in the same and other geographical areas, and some bands may form sub-bands of other bands in radio frequency spectrum. Table 1 below illustrates as an example frequency bands and modes of the UMTS LTE.

TABLE 1

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1  | 1920 MHz-1980 MHz     | 2110 MHz-2170 MHz     | FDD |
| 2  | 1850 MHz-1910 MHz     | 1930 MHz-1990 MHz     | FDD |
| 3  | 1710 MHz-1785 MHz     | 1805 MHz-1880 MHz     | FDD |
| 4  | 1710 MHz-1755 MHz     | 2110 MHz-2155 MHz     | FDD |
| 5  | 824 MHz-849 MHz       | 869 MHz-894 MHz       | FDD |
| 6[1] | 830 MHz-840 MHz     | 875 MHz-885 MHz       | FDD |
| 7  | 2500 MHz-2570 MHz     | 2620 MHz-2690 MHz     | FDD |
| 8  | 880 MHz-915 MHz       | 925 MHz-960 MHz       | FDD |
| 9  | 1749.9 MHz-1784.9 MHz | 1844.9 MHz-1879.9 MHz | FDD |
| 10 | 1710 MHz-1770 MHz     | 2110 MHz-2170 MHz     | FDD |
| 11 | 1427.9 MHz-1447.9 MHz | 1475.9 MHz-1495.9 MHz | FDD |
| 12 | 699 MHz-716 MHz       | 729 MHz-746 MHz       | FDD |
| 13 | 777 MHz-787 MHz       | 746 MHz-756 MHz       | FDD |
| 14 | 788 MHz-798 MHz       | 758 MHz-768 MHz       | FDD |
| 15 | Reserved              | Reserved              | FDD |
| 16 | Reserved              | Reserved              | FDD |
| 17 | 704 MHz-716 MHz       | 734 MHz-746 MHz       | FDD |
| 18 | 815 MHz-830 MHz       | 860 MHz-875 MHz       | FDD |
| 19 | 830 MHz-845 MHz       | 875 MHz-890 MHz       | FDD |
| 20 | 832 MHz-862 MHz       | 791 MHz-821 MHz       | FDD |
| 21 | 1447.9 MHz-1462.9 MHz | 1495.9 MHz-1510.9 MHz | FDD |
| 22 | 3410 MHz-3490 MHz     | 3510 MHz-3590 MHz     | FDD |
| 23 | 2000 MHz-2020 MHz     | 2180 MHz-2200 MHz     | FDD |
| 24 | 1626.5 MHz-1660.5 MHz | 1525 MHz-1559 MHz     | FDD |
| 25 | 1850 MHz- 1915 MHz    | 1930 MHz-1995 MHz     | FDD |
| ...|                       |                       |     |
| 33 | 1900 MHz-1920 MHz     | 1900 MHz-1920 MHz     | TDD |
| 34 | 2010 MHz-2025 MHz     | 2010 MHz-2025 MHz     | TDD |
| 35 | 1850 MHz-1910 MHz     | 1850 MHz-1910 MHz     | TDD |
| 36 | 1930 MHz-1990 MHz     | 1930 MHz-1990 MHz     | TDD |
| 37 | 1910 MHz-1930 MHz     | 1910 MHz-1930 MHz     | TDD |
| 38 | 2570 MHz-2620 MHz     | 2570 MHz-2620 MHz     | TDD |
| 39 | 1880 MHz-1920 MHz     | 1880 MHz-1920 MHz     | TDD |
| 40 | 2300 MHz-2400 MHz     | 2300 MHz-2400 MHz     | TDD |
| 41 | 2496 MHz 2690 MHz     | 2496 MHz 2690 MHz     | TDD |
| 42 | 3400 MHz-3600 MHz     | 3400 MHz-3600 MHz     | TDD |
| 43 | 3600 MHz-3800 MHz     | 3600 MHz-3800 MHz     | TDD |

Note
[1]Band 6 is not applicable

Some radio communication networks may utilize a time-division duplex (TDD) method that terminals may correspondingly support. In TDD systems, transmission and reception is carried out on the same allocated frequency band. Other TDD frequency bands may be employed in the same and other geographical areas, and some bands may form sub-bands of other bands in the radio frequency spectrum. FDD and TDD systems may be employed in the same geographical areas, and some TDD bands may be arranged to be adjacent to FDD downlink and/or uplink frequency bands. In some employment, FDD and TDD systems band allocations may overlap. All of these non-overlapping and overlapping bands may be considered as sub-bands in the context of the present description. In some TDD implementations TX and RX operational frequencies are with predefined frequency offset to improve interoperability.

For example, a frequency band of a Japanese operator AXGP (2545-2575 MHz) overlaps partially with a frequency band of an US operator Clearwire (2496-2620 MHz), while band 41 of the UMTS LTE in Table 1 occupies a portion of band 38. On the same frequency range exist a communication system for band 7 FDD and for example a Wimax system (Worldwide Interoperability for Microwave Access). Additionally, an LTE system occupying band 40 (TDD) and a WLAN (Wireless Local Area Network) operating on an ISM (Industrial, Scientific, and Medical) band may have practically zero Hz frequency separation.

Radio communication systems allocated close to each other in the frequency domain may generate interference problems such as adjacent channel leakage (ACL), wide band noise, blocking, intermodulation, cross-modulation, etc. Even when there is some frequency separation between systems, harmonic power and ACL may cause interference particularly on higher frequencies. Interference victim and/or source may be a radio communication link, the same radio communication system, the same radio terminal, an external radio terminal, downlink/uplink transmission/reception with all possible combinations. Additionally, interference may be generated by the same communication link, e.g. in CA transmission harmonic interference and/or ACL may interfere with another CA reception band. In another example, a victim may be another radio system, e.g. a Global Positioning System (GPS) receiver suffering from at least one of harmonic interference, ACL interference, and wide band noise. The interference may result in degraded quality of voice or data, dropped link, degraded probability of connection establishments, degraded power class, degraded data class, degraded data throughput, and/or no connection.

In some embodiments, the support for the different operating bands in terminal device may be implemented by applying multiple filters on the same band. These implementations may be realized by at least two filters, e.g. split-band filters operating on adjacent frequency bands, or a passband may overlap between the filters. For example, the split-band filter may be realized to operate on UMTS LTE band 41 (2496-2690 MHz) such that the band 41 is split into three sub-bands, wherein one filter is tuned to each sub-band. The sub-bands of the 41 may be split into, for example, 2496-2572 MHz (sub-band 1), 2572-2614 MHz (sub-band 2), and 2614-2690 MHz (sub-band 3). Other splits can be done according to the architecture and other technical and/or commercial requirements.

As a further example, frequency bands above 3 GHz, for example bands 33 and 34 have a broad passband, and even the broad frequency bands may be covered by using split-band filters, each sub-band filtercovering a sub-band of the broad frequency band. Other equivalents of the split band-filter arrangement include a frequency tunable filter, a duplexer, a diplexer, wherein a passband may be tunable to realize the sub-bands.

With respect to the terminal device 102, it typically comprises a radio frequency (RF) filters, at least one duplexer, low pass filters, high pass filters, and/or at least one diplexer having a bandwidth configured according to the native operating frequency band of the terminal device. In FDD systems, a duplexer may be used to combine downlink and uplink paths to the same antenna. In some radio frequency (RF) architectures, transmission and reception may have separate antennas, so bandpass filters may be used. In some embodiments, multiple-input-multiple-output (MIMO) and/or diversity reception paths may be realized by multiple filters arranged to have the same passband. Filters may also be combined together to reduce the number of interfaces to subsequent functional elements, e.g. a low-noise amplifier (LNA), band switches, antenna switches, mode switches, and corresponding special purpose elements/components. In some embodiments, the RF filter(s) may be tunable so as to shift corner frequencies as desired. In this manner, the RF filter(s) may be tuned from a $1^{st}$ operational band to another frequency band according to the communication requirements or network measurements. Additionally, the tunable RF filter(s) may be adjusted according to sub-band frequency allocation, as defined by the radio access network, wherein a bandwidth (BW), frequency resource blocks (RB), the number of carriers, and the number of carrier components may be selected by the radio access network according to the designed special purpose capability of the terminal device, needed special purpose interfaces, special purpose controls, special purpose control algorithms, special purpose firmware, special purpose feedback information, special purpose memories, and special purpose processors.

For example, if the terminal device 102 is configured to operate on the LTE Band 9, the RF filters/duplexers of the terminal device 102 may be tuned to provide a pass band having corner frequencies around 1844.9 and 1879.9 MHz in downlink and around 1749.9 and 1784.9 MHz in uplink. On the other hand, if the terminal device 102 is configured to operate on the LTE Band 3, the RF filters/duplexers of the terminal device 102 are designed or tuned to provide a passband having corner frequencies around 1805 and 1880 MHz for downlink and for uplink between frequencies 1710 and 1785 MHz, respectively. It should be noted that the terminal device 102 is in use allocated radio resources within this pass band, but the pass band of the RF filter may remain fixed regardless of the changes in the radio resource allocation. If the terminal device 102 supports operation on both bands III and IX, it may have two RF filters, wherein one of the RF filters may be selected for example with a switch or a frequency-selecting special purpose components, e.g. an active/passive duplexer, a diplexer and/or a special purpose power splitter.

In such a scenario where the native frequency band of the terminal device 102 forms a sub-band of the operating frequency band of the cellular communication system in which the terminal device 102 roams, e.g. operates as a visiting terminal, the cellular communication network may prioritize allocating to the terminal device 102 frequencies on the native frequency band of the terminal device 102. While some of the following examples relate to the roaming terminal device, the described functionalities are equally applicable to a terminal device that resides in its home network. Let us now refer to an embodiment shown in a flow diagram of FIG. 2. The flow diagram relates to a process that may be carried out as a radio resource allocation algorithm in a network element of the cellular communication network, e.g. a radio resource allocator of the base station 100. Referring to FIG. 2, appearance of a terminal device 102 residing in the cellular communication system is detected in block 202. The terminal device 102 may be a roaming terminal device, or it may reside in its home network, but let us now consider the roaming terminal device as an example. In block 204, it is determined in connection with registering the roaming terminal device 102 in the cellular communication system that a native frequency band of the roaming terminal device 102 is a sub-band of an operating frequency band of the cellular communication system. In block 206, frequency resources from the native frequency band of the roaming terminal device 102 are then allocated to the terminal device 102. Block 206 may be carried out by a resource allocator comprised in the network element or elsewhere, and the resource allocator may allocate to the roaming terminal device 102 frequency resources exclusively from the sub-band. In other words, the resource allocator prevents allocating frequencies of the cellular communication system that are outside the sub-band the terminal device supports natively.

For example, if the cellular communication system utilizes Band 3 of the LTE while the terminal device supports communication on Band 3 and Band 4, the network element may configure the terminal device to use Band 4 in the communication in the cellular communication system. In general, the network element may allocate the terminal device to another frequency band than the nominal frequency band of the cellular communication system, wherein the other band forms the sub-band of the nominal frequency band of the cellular communication system. As a consequence, the terminal device may use the RF filter of the other, narrower frequency band, which results in better performance. Thereafter, the network element may configure a resource allocator of the cellular communication system to allocate to the terminal device frequencies only from the sub-band, e.g. the Band 4.

In an embodiment, both uplink and downlink bands of the terminal device are allocated to form sub-bands of the nominal uplink and downlink frequency bands of the cellular communication system in an FDD system. In another embodiment, only one of the uplink and downlink bands of the terminal device is allocated to form a sub-band of the nominal uplink or downlink frequency bands of the cellular communication system.

In an embodiment, the algorithm reallocates at least one of the other terminal devices operating on the native frequency band of the roaming terminal device 102 to make room for the roaming terminal device on its native frequency band. The reallocation may comprise moving at least one other terminal device from the native frequency band of the roaming terminal device 102 to a frequency band out of the native frequency band. Accordingly, the native frequency band of the roaming terminal device 102 is freed to make room for the roaming terminal device 102. Such another terminal device may be a terminal device having the cellular communication network as a home network. Such another terminal device may alternatively be another roaming terminal device, and the reallocation may be provide the network with a more suitable allocated frequency distribution in terms of interference and filtering capability Allocating the frequency resources, e.g. one or more carriers, that are within the native frequency band of the terminal device 102 allows the terminal device to utilize its narrowband RF filter in the communication with the cellular communication network. This has several advantages: the lower bandwidth results in better efficiency of the RF filter by reducing insertion losses in transmission and/or reception, for example, thus allowing to use lower transmit power to achieve the same result. This reduces power consumption in the transmitter and the amount of interference in a radio interface when compared to a situation where the base station allocates to the roaming terminal device 102 arbitrary frequency resources within its own operating frequency band. It also allows a terminal device 102 dedicated to operate on its native frequency band to communicate with the base station 100. Further advantage is that there is no need to equip the terminal device with a separate RF filters/duplexers for the two operating frequency bands so as to support roaming. The above-mentioned frequency resources may refer to uplink and/or downlink resources.

The network element may determine the operating frequency band and other operational parameters of the terminal device 102 from a terminal classification communicated from the terminal device 102 to the network element in connection with registering the terminal device 102 in the cellular network. For example, the native frequency band, the supported frequency band, and any other operational parameters of the terminal device 102 may be communicated from the terminal device 102 to the network element in UECapabilityInformation which is an UMTS LTE information element comprising an ue-CapabilityRAT-Container carrying an UE-EUTRA-Capability Information Element. This information element carries RF Parameters and MeasParameters fields used by the terminal device to indicate the frequency bands it supports and any necessary measurement parameters. The terminal device 102 may report supported frequency bands of any other radio access scheme, e.g. GSM (Global System for Mobile Communications) or another 2G system, W-CDMA (Wideband Code Division Multiple Access) or another 3G system.

In an embodiment, the terminal device 102 is equipped with at least two RF filters providing different bandwidths or, in other words, a sub-band within a broader band, and the network element may be configured to prioritize the between bandwidths, e.g. by preferring the narrower bandwidth whenever possible. The terminal device 102 may thus carry out at least some of the special purpose communication with the cellular communication network by using the RF filter having the lower bandwidth. The selection of the appropriate RF filter may be triggered autonomously in the terminal device 102 upon identifying the cellular communication network in which the terminal device 102 is capable to roam. Thus, the terminal device 102 may deduce from the cellular communication network type whether or not the network supports the feature of utilizing the native frequency band of the terminal device 102. In another embodiment, the base station 100 or another network element of the cellular communication network may transmit a signal triggering the terminal device 102 to select the appropriate RF filter. FIG. 3 illustrates an embodiment of the process where the prioritization is used. Referring to FIG. 3, it is determined in block 302 that the roaming terminal device supports, in addition to its native frequency band, also the operating frequency band of the cellular communication system having a higher bandwidth than the bandwidth of the native frequency band. For example, when the terminal device 102 has the LTE Band 9 as the native frequency band, block 302 comprises detecting that the terminal device 102 is capable of operating also on the LTE Band 3. This information may also be derived from the terminal device classification. The terminal device classification may comprise a special purpose information element indicating this capability, or the information may be contained in another special purpose information element used to convey another special purpose operational parameter of the terminal device. These operational parameters may include a power class, a downlink (DL) MIMO Class, an uplink (UL) MIMO class, data class, the number of antennas, and/or a terminal category. In block 304, the native frequency band of the roaming terminal device is prioritized over the other frequency bands of the operating frequency band of the cellular communication system when allocating frequency resources to the roaming terminal device. In an embodiment, if frequency resources are available for allocation on the native frequency band and outside the native frequency band, the frequency resources on the native frequency band are allocated to the roaming terminal device 102. On the other hand, if only frequency resources outside the native frequency band are available, the radio resource allocator may still allocate such frequencies to the roaming terminal device 102.

Above, there has been considered embodiments where frequency resources on at least one carrier are allocated to the terminal device. Carrier aggregation (CA) is a topic developed to provide bandwidths wider than a basic bandwidth of a single carrier aggregation component of the cellular communication system. The carrier aggregation component may have a bandwidth up to 20 MHz or even larger in UMTS LTE-Advanced, and the carrier aggregation component may carry a plurality of sub-carriers according to Orthogonal Frequency Division (OFDM) and/or Single-Carrier Frequency-Division Multiple Access (SC-FDMA) of the 3GPP specification for the UMTS. In the CA, the effective bandwidth delivered to a user terminal is expanded through concurrent utilization of frequency resources on multiple carrier aggregation components. In other words, a plurality of component carrier aggregation components is aggregated to provide the terminal device with a larger overall bandwidth in downlink and/or uplink. FIG. 4 illustrates a flow diagram of an embodiment for arranging a CA configuration of the terminal device 102 according to the CA capability of the terminal device. Referring to FIG. 4, an apparatus comprised in the network element and arranging the CA configurations, may determine in block 402 whether or not the roaming terminal device 102 supports carrier aggregation. The supported CA configurations of the terminal device may also be determined, e.g. from the terminal classification. For example, the supported frequency bands of the roaming terminal device 102 may be determined. In block 404, the apparatus allocates to the terminal device frequency resources of at least one carrier aggregation component from the native frequency band of the roaming terminal device 102. When the terminal device 102 supports operation only on its native frequency band which is the subset of the operating frequency band of the cellular communication system, the apparatus may be configured to allocate the multiple carrier aggregation components only from the native frequency band of the terminal device 102. On the other hand, upon determining that the roaming terminal device 102 supports, in addition to its native frequency band, also the operating frequency band of the cellular communication system in the carrier aggregation, the apparatus may prioritize in block 404 the native frequency band over the other frequency bands of the operating frequency band of the cellular communication system when allocating additional carrier aggregation components to the roaming terminal device. However, the additional carriers outside the native frequency band of the terminal device 102 may also be allocated to the terminal device 102 under some circumstances. Then, the terminal device 102 may switch the operating band from the native band to the broader operating band of the cellular communication system by switching to the appropriate transmission and reception paths.

Above, there have been described embodiments where the native frequency band of the roaming terminal device 102 is a sub-band of the operating frequency band of the cellular communication system, e.g. a situation where a Japanese terminal roams in Europe. Let us now consider an opposite situation where the native frequency band of the roaming terminal device is broader than the operating frequency band of the cellular communication system in which the terminal device roams, e.g. a European Band III terminal device roams in Japan and in a Japanese cellular communication network operating on Band IX.

FIG. 5 illustrates a flow diagram of an embodiment of a process for discovering a cellular communication network and configuring operation in the cellular communication network. The process may be carried out in the terminal device 102 that roams as a visiting device in a cellular communication network. Upon being powered up or in response to another activation event, the terminal device 102 initiates in block 502 a search for a cellular communication network. The terminal device may search for a pilot signal or any broadcast signal transmitted by cellular networks. The terminal device 102 may have a split-band RF filter splitting an operating frequency band of the roaming terminal device into at least two sub-bands, and the roaming terminal device 102 may be configured to search for the cellular communication network from the at least two sub-bands in block 502. The split-band filter may be realized by providing at least two RF filters configured with different pass band frequencies. For example, Bands 2 and 25 of Table 1 may be realized by using a split-band filter, wherein one portion of the split-band filter forms Band 2 which is the sub-band of Band 25, while another portion of the split-band filter is tuned to cover the remaining 5 MHz band of Band 25. As another example, let us assume that the cellular communication system operates Band 10, while the terminal device supports at least Bands 1 and 4. Even if the terminal device does not support Band 10 directly, the network element may configure the terminal device to tune the reception band of the terminal device to Band 1, which corresponds to the reception band of Band 1 (FDD). The network element may configure the terminal device to tune the reception band of the terminal device to Band 1, which corresponds to the reception band of Band 10 (FDD). The network element may further configure the terminal device to tune the transmission band of the terminal device to Band 4, which forms a sub-band of the transmission band of Band 10 (FDD). As long as the resource allocator of the cellular communication system allocates to the terminal device transmission resources within that sub-band (Band 4), the network element may allocate to the terminal device a transmission band which is nominally different but having overlapping frequencies with the nominal band of the cellular communication system (Band 10 in this case). The same principles may be applied to the reception band.

There may be provided a switching mechanism to switch between the different RF filters, wherein the switching mechanism may be realized by frequency selectable filters, one switch or multiple switches in common nodes of reception/transmission paths containing the RF filters Switches are typically needed to combine different galvanic paths to common galvanic paths in the transmitter/receiver architecture. The switches may be understood as selecting a transmission (TX) and/or a reception (RX) path in the transmitter/receiver circuitry of the terminal device. In architecture where there are no common paths, the switches may be omitted. The terminal device may have split-band implementations in FDD and/or TDD frequency allocation systems.

In block 504, the cellular communication network operating on one of the at least two sub-bands is detected. Upon network discovery, the terminal device 102 may determine in block 506 internally whether or not it is allowed to operate in the cellular communication network. The broader frequency band of the terminal device 102 may cause certain problems related to inter-system crosstalk and inter-system interference, for example, and in order to avoid such undesired features the terminal device may check whether it is allowed to operate in the cellular network and, if it is allowed, the special conditions (if any) under which it is allowed to operate. As mentioned above, the decision may be made internally in the terminal device 102 upon recognizing the cellular network. The terminal device may store a database defining a mapping between the allowability and the different cellular networks or any other information related to the cellular networks, e.g. communication systems, continent, country, operator, or area codes. This database may be stored beforehand in the terminal device and, therefore, the terminal device only needs to identify the cellular communication network on some level to carry out block 506. Such identification may be made from a broadcast special purpose signal received from the cellular network. If the terminal device 102 determines that it is not allowed to roam in the detected cellular network, it may instantly prevent any communication with the cellular network. On the other hand, if the roaming terminal device is allowed to operate in the cellular communication network, it may determine the conditions under which it is allowed to operate in the cellular communication network. For example, the operation may require that the terminal device restricts its operative frequency band by selecting an appropriate RF filter or adjust a tunable filter to have predefined corner frequencies/frequency division. As a consequence, the terminal device 102 may select in block 506 the sub-band or sub-bands on which the cellular communication network was detected for communication with the cellular communication network.

Figure 6:
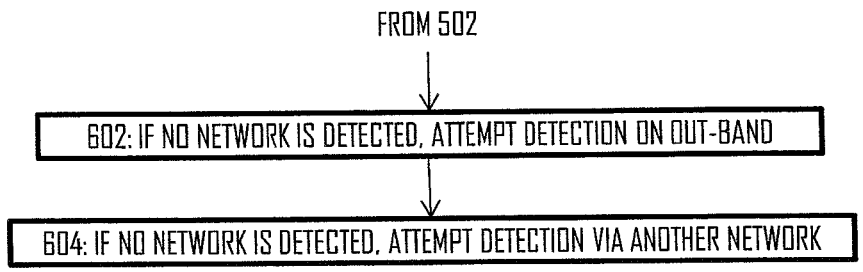

If the terminal device detects no cellular communication network from any frequency band it scans in block 502, it may execute a sub-routine of FIG. 6. Referring to FIG. 6, the terminal device may execute block 602 in response to the detection of no cellular communication networks. In block 602, the terminal device extends the search to frequency bends outside the pass band(s) of the RF filter(s) already executed. Prior to the new search, the terminal device may adjust corner frequencies of the frequency-tunable filters and, thereafter, execute the search. Adjusting the frequency-tunable filters and the search may be continued until detection of a cellular communication network. In an alternative embodiment e.g for ad hoc networks the terminal device 102 may tune its frequency synthesizer to attempt the discovery of the network from out-band. Even though the band is on the transition or even stop band of the RF filter, if the terminal device 102 is close to a base station, an access point, a router, a relay, a modem, and/or a device, the network discovery is possible and the terminal device 102 may be able to proceed in the process of FIG. 5 and even establish a communication connection for the purpose of data transfer. Network discovery cover all wireless communications including device-to-device (D2D), machine-to-machine (M2M), connected cars or vehicles V2V, etc.

Block 604 comprises another embodiment for improving means for network discovery, and block 604 may be carried out in addition to block 602 or instead of block 602, and their respective order may be reversed from what is shown in FIG. 6. Block 604 may also be carried out when the terminal device does not detect a cellular communication network. However, the terminal device 102 may have detected another wireless network, e.g. an IEEE 802.11 (WiFi or Wireless Local Area Network, WLAN) network, femtocell, picocell, other device or machine, automotive with wired connections etc. It may be envisaged that upon constantly improving wireless network cooperation, flexible spectrum utilization, and cognitive radio features, different wireless network will be developed with capability of communicating with each other. As a consequence, upon discovery of such another network, the terminal device 102 may request the other network to mediate a contact with a cellular communication system. The request may comprise the above-mentioned terminal classification or another identifier that enables the cellular communication network to identify the operating frequency of the terminal device. Upon receiving such a notification from the other wireless network, a network element of the cellular communication system may tune, if allowed, to a native operating frequency of the terminal device 102 for the purpose of providing the terminal device 102 with wireless communication services. The network element may establish, for example, a new component carrier on the native operating frequency of the terminal device 102.

Figure 7:
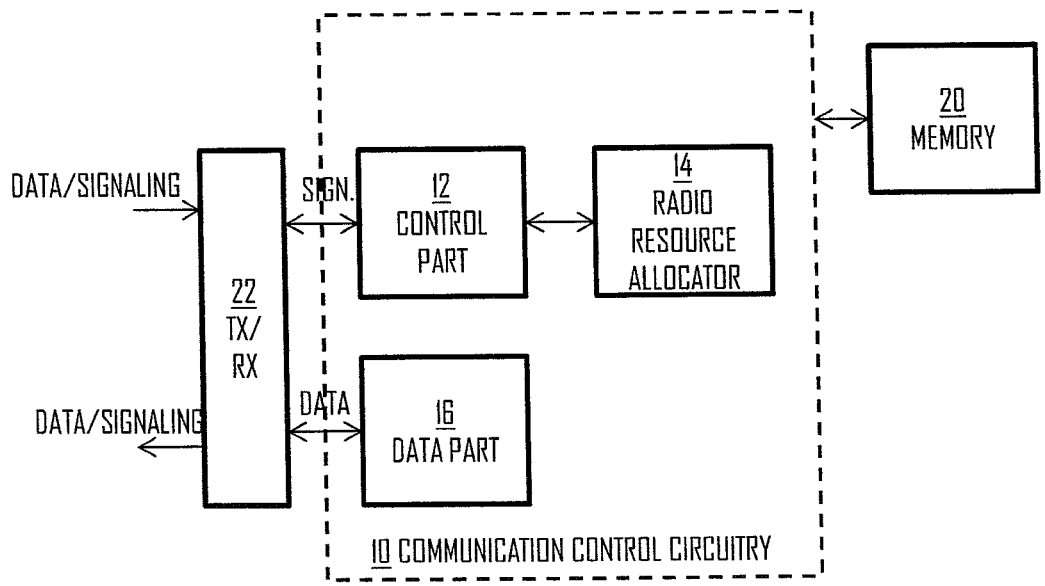
FIGS. 7 and 8 illustrate block diagrams of apparatuses according to some embodiments of the invention.

FIG. 7 illustrates an embodiment of an apparatus comprising means for carrying out the above-mentioned functionalities of the radio resource allocator apparatus and/or the network element of the cellular communication system The apparatus may be a base station or another network element of the cellular communication system. In another embodiment, the apparatus is comprised in such a communication apparatus, e.g. the apparatus may comprise a physical circuitry, e.g. a chip, a processor, a micro controller, or a combination of such circuitries in the communication apparatus.

The apparatus may comprise a communication controller circuitry 10 configured to control the communications in the apparatus. The communication controller circuitry 10 may comprise a control part 12 handling control signalling communication with respect to transmission, reception, and extraction of control frames, e.g. transmission of pilot signals, reception of terminal registration signals from terminal devices in connection with registering the terminal devices in the cellular communication system, and any radio resource signalling. The communication controller circuitry 10 may further comprise a data part 16 that handles transmission and reception of payload data with the terminal devices. The communication controller circuitry 10 may further comprise a radio resource allocator circuitry 14 configured to allocate at least frequency resources to the terminal devices. The resource allocation may be dynamic, semi-static, or static. With respect to the roaming terminal devices, the radio resource allocator circuitry 14 may receive from the control part 12 information on the roaming terminal devices and their native operating frequencies. On the basis of such information, the radio resource allocator circuitry 14 may prioritize allocating to the roaming terminal devices frequencies on their native frequency bands, if the native frequency bands form at least one sub-band of the operating frequency band of the cellular communication system. The frequency allocation may comprise allocating frequency resource blocks of a single component carrier but, in some embodiments, the frequency allocation may comprise allocating additional component carriers to the roaming terminal devices according to CA principles.

The circuitries 12 to 16 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 16 or all of them.

The memory 20 may further store computer programs (software) configuring the apparatus to perform the above-described functionalities of the apparatus. The memory 20 may also store communication parameters and other information needed for the radio resource allocation, e.g. the database storing information mapping terminal classifications to native operating frequency bands. The apparatus may further comprise radio interface components 22 and antenna systems providing the apparatus with radio communication capabilities with the terminal devices and, optionally, with other elements of the cellular communication system and/or with other wireless networks. The radio interface components 22 may comprise standard well-known components such as amplifier, filter, switch, isolator, coupler, antenna tuner, frequency-converter, (de)modulator, and encoder/decoder circuitries and one or more antennas.

In an embodiment, the apparatus carrying out the embodiments of the invention in the communication apparatus comprises at least one processor and at least one special purpose memory or/and one special purpose software (SW) executable memory including a computer program code, wherein the at least one memory and the computer program code are configured, with the at least one processor, to cause the apparatus to carry out the functionality of the radio resource allocator and/or the network element in any one of the processes of FIGS. 2 to 4. Accordingly, the at least one processor, the memory, and the computer program code form processing means for carrying out embodiments of the present invention in the network element.

Figure 8:
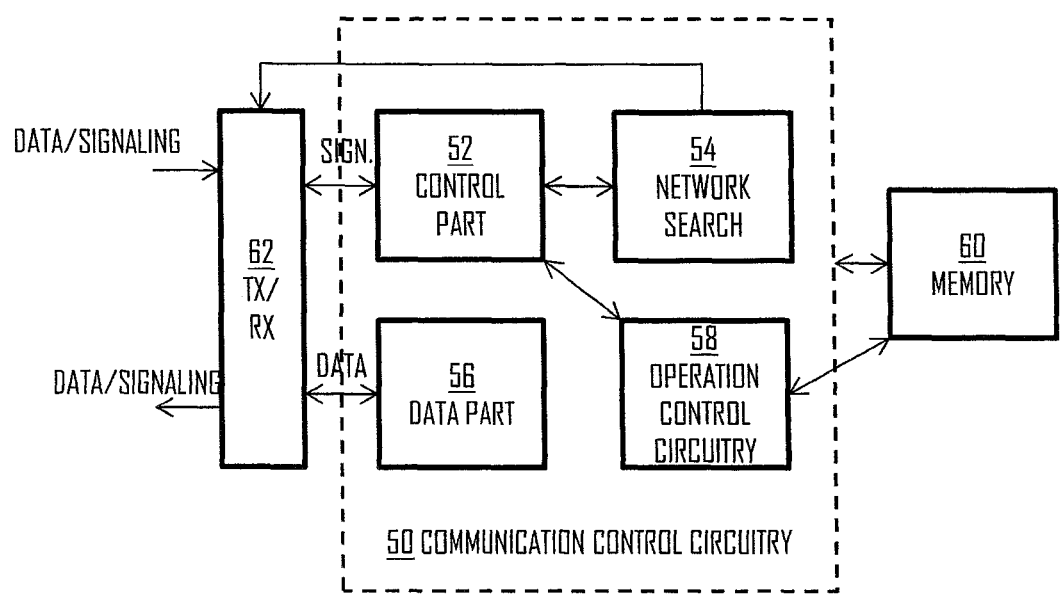

FIG. 8 illustrates an embodiment of an apparatus comprising means for carrying out the above-mentioned functionalities of the terminal device configured to operate also in visited cellular networks in a roaming mode. The apparatus may be a computer (PC), a laptop, a tablet computer, a cellular phone, a palm computer, or any other apparatus provided with radio communication capability. In another embodiment, the apparatus is comprised in such a communication apparatus, e.g. the apparatus may comprise a physical circuitry, e.g. a chip, a processor, a micro controller, or a combination of such circuitries in the communication apparatus.

The apparatus may comprise a communication controller circuitry 10 configured to control the communications in the communication apparatus. The communication controller circuitry 50 may comprise a control part 52 handling control signalling communication with respect to transmission, reception, and extraction of control frames including the pilot signals and any message exchanged in connection with registering the terminal device in a visited network, as described above. The communication controller circuitry 50 may further comprise a data part 56 that handles transmission and reception of payload data in frequency resources allocated by the cellular communication network.

The apparatus may further comprise radio interface components 62 providing the apparatus with radio communication capabilities within the BSS and/or with other BSSs. The radio interface components 62 may comprise standard well-known components such as amplifier, filter such as the above-mentioned RF filter(s), frequency-converter comprising a frequency synthesizer, (de)modulator, and encoder/decoder circuitries, switch, isolator, antenna connector, other special purposes RF component(s) and/or modules and one or more antennas/antenna systems and antenna system control signals to set antennas for selected configuration.

The communication controller circuitry 50 may further comprise a network search unit 54 configured to search for cellular communication networks during as a response to powering the terminal device up, for example. In connection with the network search, the network search unit 54 may consecutively select different RF filters in connection with network search until a cellular communication network has been discovered. The network search unit 54 may also tune the frequency synthesizer of the radio interface components 62 to tune to an out-band upon discovery of no cellular communication system within the operating band(s) of the terminal device. Upon discovery of another network with the capability of mediating connection with the cellular communication system, the network search unit 54 may also communicate with the other network in connection with requesting a connection with a cellular communication system, as described above. Upon discovering the cellular communication network, the network search unit 54 may configure the control part 52 to establish a registration procedure in which the terminal device is registered in the cellular communication system. In connection with the registration, the control part 52 may inform an operation control circuitry 58 about the network, and the operation control circuitry 58 may select appropriate operational parameters, e.g. an appropriate RF filter, needed for radio spectrum filtering in the communication with the cellular communication system, as described above.

The circuitries 52 to 58 of the communication controller circuitry 50 may be carried out by the one or more physical circuitries or processors. In practice, the different circuitries may be realized by different computer program modules. Depending on the specifications and the design of the apparatus, the apparatus may comprise some of the circuitries 52 to 58 or all of them.

The apparatus may further comprise a memory 60 to store computer programs (software) configuring the apparatus to perform the above-described functionalities of the communication apparatus. The memory 20 may also store communication parameters and other information needed for the wireless communications, e.g. the database storing information on the cellular communication systems with which the communication is allowed and, if so, under what conditions. The apparatus may further comprise a user interface enabling interaction with the user of the communication device. The user interface may comprise a display, a keypad or a keyboard, a loudspeaker, mouse, touch screen, voice, gestures etc.

In an embodiment, the apparatus carrying out the embodiments of the invention in the communication apparatus comprises at least one processor and at least one memory including a computer program code, wherein the at least one memory and the computer program code are configured, with the at least one processor, to cause the apparatus to carry out the functionality of the terminal device in any one of the processes of FIGS. 5 and 6. Accordingly, the at least one processor, the memory, and the computer program code form processing means for carrying out embodiments of the present invention in the apparatus functioning in the terminal device.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in FIGS. 2 to 6 may also be carried out in the form of a computer process defined by a computer program. The computer program may be in source code form, object code form, or in some intermediate form, and it may be stored in some sort of transitory or a non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to cellular or mobile telecommunication systems defined above, e.g. UMTS LTE and LTE-Advanced, but also to other suitable telecommunication systems, e.g. WiMAX (Worldwide Interoperability for Microwave Access), IMT (International Mobile Telecommunications), or IMT-Advanced. The protocols used, the specifications of cellular communication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
detecting, in a network element of a cellular communication system, appearance of a terminal device in the cellular communication system;
determining, in connection with registering the terminal device in the cellular communication system, that a native frequency band of the terminal device is a sub-band of an operating frequency band of the cellular communication system;
determining whether or not the terminal device supports carrier aggregation;
determining that the terminal device supports, in addition to its native frequency band, also the operating frequency band of the cellular communication system in the carrier aggregation;
allocating to the terminal device frequency resources from the native frequency band of the terminal device on at least one carrier; and
prioritizing the native frequency band over the other frequency bands of the operating frequency band of the cellular communication system when allocating additional carriers to the terminal device.

2. The method of claim 1, wherein the terminal device is a roaming terminal device.

3. The method of claim 1, further comprising:
reallocating at least one other terminal device away from the native frequency band of the terminal device to make room for the terminal device.

4. The method of claim 3, wherein:
the cellular communication system is a home network of the other terminal device.

5. The method of claim 1, further comprising:
determining that the terminal device supports, in addition to its native frequency band, also the operating frequency band of the cellular communication system having a higher bandwidth than the bandwidth of the native frequency band; and
prioritizing the native frequency band over the other frequency bands of the operating frequency band of the cellular communication system when allocating frequency resources to the terminal device.

6. The method of claim 1, wherein:
the network element is a base station in the cellular communication system.

7. An apparatus comprising:
at least one processor; and
at least one memory including program instructions, wherein the at least one memory and the computer program code are configured, with the at least one processor, to cause the apparatus to:
detect appearance of a terminal device in a cellular communication system;
determine, in connection with registering the terminal device in the cellular communication system, that a native frequency band of the terminal device is a sub-band of an operating frequency band of the cellular communication system;
determine whether or not the terminal device supports carrier aggregation;
determine that the terminal device supports, in addition to its native frequency band, also the operating frequency band of the cellular communication system in the carrier aggregation;
allocate to the terminal device frequency resources from the native frequency band of the terminal device on at least one carrier; and
prioritize the native frequency band over the other frequency bands of the operating frequency band of the cellular communication system when allocating additional carriers to the terminal device.

8. The apparatus of claim 7, wherein the terminal device is a roaming terminal device.

9. The apparatus of claim 8, wherein:
the apparatus comprises a base station in the cellular communication system.

10. The apparatus of claim 7, wherein the at least one memory and the computer program code are configured, with the at least one processor, to cause the apparatus to reallocate at least one other terminal device away from the native frequency band of the terminal device to make room for the terminal device.

11. The apparatus of claim 10, wherein:
the cellular communication system is a home network of the other terminal device.

12. The apparatus of claim 7, wherein the at least one memory and the computer program code are configured, with the at least one processor, to cause the apparatus to:
determine that the terminal device supports, in addition to its native frequency band, also the operating frequency band of the cellular communication system having a higher bandwidth than the bandwidth of the native frequency band; and
prioritize the native frequency band over the other frequency bands of the operating frequency band of the cellular communication system when allocating frequency resources to the terminal device.

13. The apparatus of claim 7, further comprising radio interface components providing the apparatus with radio communication capability.

14. A non-transitory computer readable memory storing computer program code, which when executed on a network element, causes the network element to:
detect appearance of a terminal device in a cellular communication system;
determining whether or not the terminal device supports carrier aggregation;
determining that the terminal device supports, in addition to its native frequency band, also the operating frequency band of the cellular communication system in the carrier aggregation;
determine, in connection with registering the terminal device in the cellular communication system, that a native frequency band of the terminal device is a sub-band of an operating frequency band of the cellular communication system;
allocating to the terminal device frequency resources from the native frequency band of the terminal device on at least one carrier; and
prioritizing the native frequency band over the other frequency bands of the operating frequency band of the cellular communication system when allocating additional carriers to the terminal device.

15. The non-transitory computer readable memory according to claim 14, wherein the terminal device is a roaming terminal device.

16. The non-transitory computer readable memory according to claim 14, wherein the computer program code further causes the network element to reallocate at least one other terminal device away from the native frequency band of the terminal device to make room for the terminal device.

17. The non-transitory computer readable memory according to claim 16, wherein:
the cellular communication system is a home network of the other terminal device.

18. The non-transitory computer readable memory according to claim 14, wherein the computer program code further causes the network element to:
determine that the terminal device supports, in addition to its native frequency band, also the operating frequency band of the cellular communication system having a higher bandwidth than the bandwidth of the native frequency band; and
prioritize the native frequency band over the other frequency bands of the operating frequency band of the cellular communication system when allocating frequency resources to the terminal device.

19. The non-transitory computer readable memory according to claim 14, wherein the network element comprises radio interface components providing the network element with radio communication capability.

20. The non-transitory computer readable memory according to claim 14, wherein:
the network element comprises a base station in the cellular communication system.

* * * * *